US012064982B2

(12) United States Patent
Crone et al.

(10) Patent No.: US 12,064,982 B2
(45) Date of Patent: Aug. 20, 2024

(54) COATING MODULE FOR COATING A THIN LAYER OF INK ON A RIBBON

(71) Applicant: ARMOR, Nantes (FR)

(72) Inventors: Klaus Peter Crone, Hennef (DE); Alain Saurer, Bôle (CH); Niklaus Schneeberger, Köniz (CH); Manuel Thomet, Liebefeld (CH); Marc Meienberger, Bern (CH); Ferchaud Benjamin, Nantes (FR)

(73) Assignee: ARMOR, Nantes (FR)

( * ) Notice: Subject to any disclaimer, the term of this patent is extended or adjusted under 35 U.S.C. 154(b) by 0 days.

(21) Appl. No.: 18/257,256

(22) PCT Filed: Dec. 13, 2021

(86) PCT No.: PCT/EP2021/085518
§ 371 (c)(1),
(2) Date: Jun. 13, 2023

(87) PCT Pub. No.: WO2022/128929
PCT Pub. Date: Jun. 23, 2022

(65) Prior Publication Data

US 2023/0398800 A1 Dec. 14, 2023

(30) Foreign Application Priority Data

Dec. 14, 2020 (EP) .................................... 20213814

(51) Int. Cl.
*B41J 31/16* (2006.01)
*B05C 1/08* (2006.01)
(Continued)

(52) U.S. Cl.
CPC ............... *B41J 31/16* (2013.01); *B05C 1/083* (2013.01); *B41J 31/00* (2013.01); *B41J 2/325* (2013.01);
(Continued)

(58) Field of Classification Search
CPC .. B41J 31/00; B41J 31/16; B05C 1/08; B05C 1/0808; B05C 1/083
See application file for complete search history.

(56) References Cited

U.S. PATENT DOCUMENTS 3,937,178 A * 2/1976 Newman .................. B41J 31/16 118/109
4,369,451 A * 1/1983 Sekido ....................... B41J 2/33 347/225
(Continued)

FOREIGN PATENT DOCUMENTS

CN 203046485 U 7/2013
CN 210935641 U 7/2020
(Continued)

OTHER PUBLICATIONS

International Search Report as issued in International Patent Application No. PCT/EP2021/085518, dated Mar. 25, 2022.
(Continued)

*Primary Examiner* — Jill E Culler
(74) *Attorney, Agent, or Firm* — Pillsbury Winthrop Shaw Pittman LLP

(57) ABSTRACT

A coating module for variable speed ribbon coating, the coating module including a ribbon including an inner face and an outer face; a conveyor system including a support element holding and transporting the ribbon on its inner face; a squeeze ink roller arranged in contact with the outer face of the ribbon; the squeeze ink roller including an outer layer made of elastic material; a reservoir assembly designed to hold ink thereon and to feed the squeeze ink roller with the ink, and a pressure controller including an active element for pressing the ribbon between the squeeze ink roller and the support roller along a coating zone.

15 Claims, 5 Drawing Sheets

(51) Int. Cl.

| | |
|---|---|
| ***B41J 31/00*** | (2006.01) |
| *B41J 2/325* | (2006.01) |
| *B41J 31/05* | (2006.01) |
| *B41J 33/26* | (2006.01) |
| *B41J 33/36* | (2006.01) |

(52) U.S. Cl.

CPC ................ *B41J 31/05* (2013.01); *B41J 33/26* (2013.01); *B41J 33/36* (2013.01)

(56) References Cited

U.S. PATENT DOCUMENTS

| | | | | |
|---|---|---|---|---|
| 6,011,573 | A * | 1/2000 | Nagahamaya ..... B41M 5/38221 | 400/202 |
| 6,103,314 | A | 8/2000 | Kinnunen | |
| 8,302,555 | B2 * | 11/2012 | Nakazawa ............ B05C 1/0813 | 347/101 |
| 8,922,611 | B1 * | 12/2014 | Benton .................... B41J 2/325 | 347/213 |
| 2004/0135870 | A1 | 7/2004 | Furuyama | |

FOREIGN PATENT DOCUMENTS

| | | | |
|---|---|---|---|
| EP | 0 029 313 | A2 | 5/1981 |
| EP | 0 412 179 | A1 | 2/1991 |
| EP | 3 020 558 | A1 | 5/2016 |
| FR | 2 374 966 | A1 | 7/1978 |
| JP | S62-268672 | A | 11/1987 |
| JP | S62-297178 | A | 12/1987 |
| JP | H01-152078 | A | 6/1989 |
| JP | H01-188368 | A | 7/1989 |
| JP | H08-11331 | A | 1/1996 |
| JP | 2006-321120 | A | 11/2006 |

OTHER PUBLICATIONS

Written Opinion of the International Searching Authority as issued in International Patent Application No. PCT/EP2021/085518, dated Mar. 25, 2022.

First Notice of Review Observations as issued in Chinese Patent Application No. 202180093747.4, dated Feb. 27, 2024.

* cited by examiner

COATING MODULE FOR COATING A THIN LAYER OF INK ON A RIBBON

CROSS-REFERENCE TO RELATED APPLICATIONS

This application is the U.S. National Stage of PCT/EP2021/085518, filed Dec. 13, 2021, which in turn claims priority to European patent application number 20213814.5 filed Dec. 14, 2020. The content of these applications are incorporated herein by reference in their entireties.

FIELD OF INVENTION

The present invention relates to a coating module, preferably to a coating module for a thermal transfer printing apparatus, for a thin coating with all types of ink. The invention also relates to a method to coat a ribbon with ink.

BACKGROUND OF INVENTION

Current solutions involving a thermal transfer printing apparatus use a disposable already coated ribbon. One limitation of these solutions is that the ribbon needs to be replaced periodically as the end of the ribbon has been reached.

To cope with the disposal of such used ribbon along with the remaining un-transferred ink, in an alternative class of thermal transfer printing apparatus, an endless ribbon is continuously coated and exposed to the thermal head while recovering the non-printed ink.

Such solutions offer reusing the remaining portion of the ink that is not used in previous thermal transfer printing cycles and reduce the wastes produced from the disposable ribbon of the printing apparatus.

This imposes, amongst other steps, coating new ink continuously on the ribbon to ensure a homogenous layer of ink on the ribbon while printing.

Furthermore, EP0412179 teaches a re-inking device for a thermal transfer printer comprising an endless ribbon. The ink is transported by an ink roller comprising depressions on its circumferential surface, picking up the ink to coat the ribbon. In this solution the surface of the ink roller is engraved: it comprises a rastered (or textured) surface structure. The depth of these cells (or circumscribed cavities) forming the depression is a few μm. A range of approximately 8 to 25 μm appears to be technically sensible, with a cell depth of approximately 15 μm proving to be particularly advantageous.

A first limitation of such a coating system is that the cavities impose a choice of the size range of the particles within the ink. For example, when the particles sizes within the ink are larger than the cavities, the full distribution of particles within the ink cannot be applied properly. This solution does not allow a great variability of uses of various inks.

A second limitation is that said coating system is not capable to coat a constant thickness on the ribbon at variable speeds.

A third limitation of this device is that the circumferential surface has to be cleaned regularly. Indeed, such cavities can retain ink and lose their advantage when the surface of the roller has been used after a few cycles.

A fourth limitation is that because the ink is transported by the cavities of the ink roller, some inks are not compatible with such coating to system. For example, an ink comprising colorant particles having a size superior to the size of the cavities is not compatible with said ink roller. Indeed, the particles cannot be transported within the depressions of surface structure of the ink roller. This may also lead to an undesired local heterogeneous inconsistency of the ink during coating when ink contains particles of several size distributions.

The invention aims to provide a method and a coating module avoiding these limitations. The invention aims to provide a coating module more agile, versatile that allows a large variety of inks to be coated and printed.

SUMMARY

The invention relates to a coating module for variable speed ribbon coating. Said coating module comprises a conveyor system holding and transporting a ribbon; a coater to coat the ribbon with hot melted ink. Said coater comprises a squeeze ink roller to transport the hot melted ink on its circumferential surface. Said squeeze ink roller comprises an outer layer made of elastic material.

The coating module further comprises a reservoir assembly designed to hold hot melted ink thereon and to feed the coater with said hot melted ink. The coating module comprises a pressure controller comprising an active element for pressing the squeeze ink roller against the conveyor system to modify a pressure applied on ink between the squeeze ink roller and the ribbon supported by the conveyor system along a coating zone. The elastic material of the outer layer is intended to be elastically deformed against the conveyor system when the squeeze ink roller is pressed against the conveyor system.

According to one aspect, the invention relates to a coating module for variable speed ribbon coating; said coating module comprising:

- a ribbon comprising an inner face and an outer face;
- a conveyor system comprising a support element holding and transporting the ribbon on its inner face;
- a squeeze ink roller arranged in contact with the outer face of the ribbon; said squeeze ink roller comprising an outer layer made of elastic material;
- a reservoir assembly designed to hold ink thereon and to feed the squeeze ink roller with said ink;
- a pressure controller comprising an active element for pressing the ribbon between the squeeze ink roller and the support roller along a coating zone.

The advantage of the outer layer of the squeeze ink roller is to allow a thin coating with any types of ink on the ribbon. Advantageously, the coating module further allows such coating when the ribbon is driven at low speed (e.g., less than 1 m/s).

In one embodiment, both the surface of the squeeze ink roller and the surface of the support roller in contact with the ribbon being smooth.

The advantage of the smooth surface is that the ink provided in the coating zone is reduced. Another advantage is that the stress profile applied to the ink between the squeeze ink roller and the ribbon along the coating zone in a plane perpendicular to the longitudinal axis of rotation of the squeeze roller or the support roller presents a shape of symmetric bell curve or a parabolic shape, at least in a center portion of the coating zone. Therefore, it ensures that the stress applied remains above a threshold allowing the coating of thinner layer of ink.

Such behavior during a sufficient length advantageously improves the control of the coating.

In one embodiment, the circumferential surface of the squeeze ink roller is a smooth surface. In one embodiment, the circumferential surface of the support roller is a smooth surface. In one embodiment, both the inner face and the outer face of the ribbon is a smooth surface.

In one embodiment, the arithmetic average of the roughness profile of the circumferential surface of the squeeze ink roller is inferior to 2 micrometers, preferably inferior to 0.5 μm.

In one embodiment, the surface of the squeeze ink roller does not comprise a raster of depressions or cavities having a depth superior to 5 μm.

In one embodiment, the elasticity of the outer layer, the surface of the squeeze ink roller, and the surface of the support roller, are designed in such a way that the stress applied to the ink along the coating zone in a plane perpendicular to the longitudinal axis of the support roller is monotonic on both sides of a global maximum.

In one embodiment, the pressure controller is configured to control a pressure between the squeeze ink roller and the conveyor system in order to deform the outer layer of the coater zone in accordance with its predefined hardness.

In one embodiment, the pressure controller is configured to automatically adjust the pressure between the squeeze ink roller and the conveyor system to keep the thickness of ink coated on the ribbon constant when the first speed is modified.

In one embodiment, the pressure controller is configured to automatically adjust the pressure between the squeeze ink roller and the conveyor system to modify the thickness of ink coated on the ribbon keeping a first speed of the ribbon constant.

In one embodiment, the coating module comprises a speed controller, wherein the speed controller comprises a first motor for controlling a first speed of the ribbon and/or a second motor for controlling a second tangential speed of the squeeze ink roller.

In one embodiment, the speed controller is configured to automatically adjust the second speed to keep the thickness of ink coated on the ribbon constant when the first speed is modified.

In one embodiment, the speed controller is configured to automatically adjust the second speed to modify the thickness of ink coated on the ribbon keeping the first speed constant.

In one embodiment, the speed controller comprises instructions for maintaining a ratio of the first speed to the second speed into a predefined range from 0 to 3, preferably between 0 and 0.85 or between 1.1 and 3.

In one embodiment, the conveyor system comprises a conveyor belt holding and transporting the ribbon; said conveyor belt being held and transported by at least two rollers.

In one embodiment, the conveyor belt is held by a roller along the coating zone.

In one embodiment, the roller comprises an outer face made of material enabling the conveyor belt to be driven by friction by said roller.

In one embodiment, the coater comprises a reservoir intended to hold hot melted ink thereon and wherein the squeeze ink roller is in contact with the ink in the reservoir and the coating module further comprising an ink controller to control the angle between the squeeze ink roller and a level of ink in the reservoir.

In one embodiment, the ink reservoir is arranged to recover an excess of ink squeezed between the ink roller and the ribbon. In one embodiment, the coating module further comprises a heater to heat a remaining ink on the ribbon. In one embodiment, the deformation of the outer layer allows increasing the length of the contact between the ink roller and the ribbon. In one embodiment, the coating module further comprises a sensor to measure the thickness of a layer of ink coated on the ribbon.

The invention further relates to a thermal transfer printing apparatus comprising a coating module according to the invention. The ribbon is an endless ribbon, and the printing apparatus further comprises a printhead and a conveyor system being designed to hold and transport the ribbon from coater to the printhead in a cyclic manner.

The invention further relates to a method to coat a ribbon. Said method comprises:

- Providing coating module according to the invention;
- Providing ink from the reservoir to the squeeze ink roller;
- Transporting the ribbon along its path between the support roller and the squeeze ink roller;
- Heating the ink in contact with both the squeeze ink roller and the ribbon;
- Applying a pressure to said ink between the ribbon and the squeeze ink roller;

DETAILED DESCRIPTION

Figure 1A:
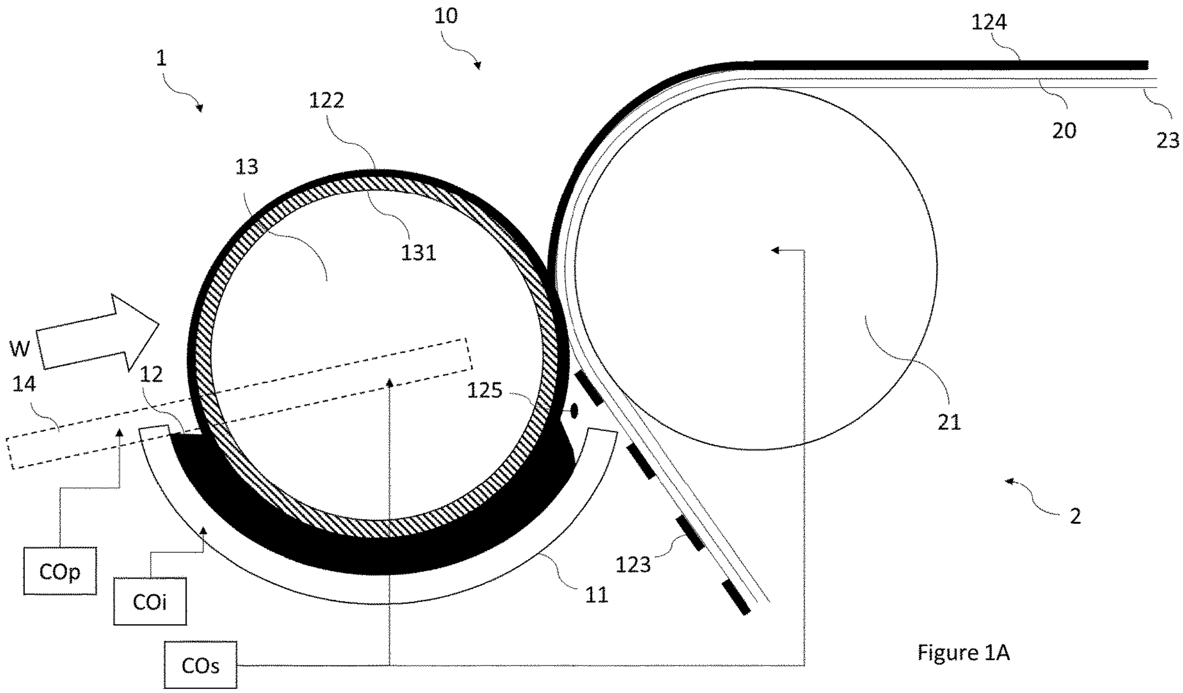
FIG. 1A is a schematic view of a coating module according to one embodiment of the present invention.

The coating module 10 comprises a conveyor system 2. The conveyor system 2 is designed to hold and transport a ribbon 20. The conveyor system 2 preferably comprises rollers holding and transporting, directly or indirectly the ribbon 20 along a predefined path.

At least one of these rollers is a drive roller. The conveyor system 2 comprises a motor to rotate the drive roller. The drive roller may control the speed of the ribbon 20.

Squeeze Ink Roller

The coater module 10 aims to coat the ribbon 20 with hot melted ink 12. The coater 1 comprises a squeeze ink roller 13. The squeeze ink roller 13 is designed to transport the hot melted ink 12 on its circumferential surface. The hot melted ink 12 is transported or transferred from the circumferential surface of the squeeze ink roller 13 to the ribbon 20.

The squeeze ink roller 13 is mounted to the frame to rotate on itself to transport ink on its circumferential surface. In one embodiment, the squeeze ink roller 13 has the shape of a cylinder and is mounted to the frame of the coating system to rotate around its longitudinal axis.

The squeeze ink roller 13 and the conveyor system are arranged in such a way that the outer face 51 of the ribbon 20 is in contact with the circumferential surface of the squeeze ink roller 13. Preferably, the conveyor system comprises a support element supporting the inner face of the portion of the ribbon in contact with the squeeze ink roller 13.

The contact between the circumferential surface of the squeeze ink roller 13 and the ribbon 20 creates a coating zone (and nip) wherein the hot melted ink is squeezed between the ribbon 20 and the squeeze ink roller 13. The ink is optionally sheared to be coated onto the ribbon 20.

Support Element and Coating Zone

The "coating zone" may be defined by the face or the area of contact between the ribbon 20 and the squeeze ink roller 13. More preferably the "coating zone" may be defined by a portion of the circumferential surface of the squeeze ink roller 13 and a portion of the ribbon 20 wherein the ink layer on the ribbon 20 is merged into the ink layer of the squeeze ink roller 13.

The conveyor system 2 comprises a support 21 to the ribbon 20 on its inner face along at least a part of the coating zone A. By the "inner face", it should be understood the face opposite to the squeeze ink roller 13 and/or the face of the ribbon 20 opposite to the face of the ribbon 20 coated with ink by the squeeze ink roller 13.

One advantage of said support is to support the ribbon 20 when the squeeze ink roller 13 is pressed against the conveyor system 2. Then, the outer layer 131 made of elastic material is elastically deformed when the squeeze ink roller 13 is pressed against the conveyor system 2 and/or is pressed against the support 21.

The ribbon on the conveyor system 2 and the squeeze ink roller 13 are arranged to be in contact along a coating zone A wherein the hot melted ink on the squeeze ink roller 13 is squeezed between the circumferential surface of the squeeze ink roller 13 and the ribbon 20. The conveyor system 2 and the squeeze ink roller 13 are arranged to create a sliding contact between the circumferential surface of the squeeze ink roller 13 and the ribbon 20. The contact is made in such a way to allow transferring the hot melted ink from the squeeze roller to the ribbon 20. The sliding contact may also be a coating contact.

Figure 1B:
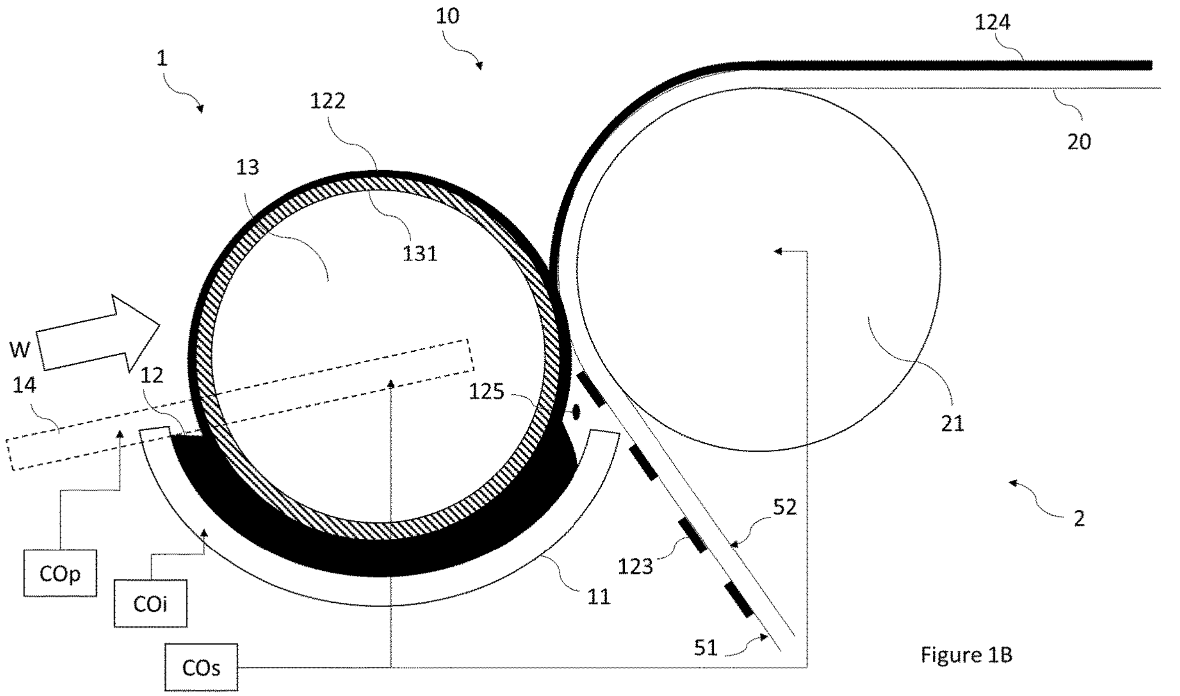
FIG. 1B is a schematic view of a coating module wherein the conveyor system comprises a conveyor belt transporting the ribbon.

In a first embodiment illustrated in FIGS. 1A and 1B, the conveyor system 2 comprises a roller supporting the ribbon 20 along the coating zone A. In said illustrated embodiment, the support 21 is a support roller holding and supporting the ribbon 20. Preferably, the support roller 21 holds and supports the ribbon 20 along the coating zone A.

In one embodiment, the support roller 21 has the shape of a cylinder and is mounted to the frame to rotate around its longitudinal axis.

One advantage of the support roller 21 is to drive and/or ensure the motion of the ribbon 20 along its path within the coating zone A.

In another non-illustrated embodiment, the support comprises a guide for guiding and supporting the ribbon 20 by its inner face. The guide is preferably a curving guide or a partially rounded shape guide.

In the following description, the term "support roller" is used but the skilled person will understand that said support roller should also be replaced by a support plate to support the ribbon within the coating zone A. During its transport, the ribbon slides against the support plate along its length.

In one embodiment, the coating zone comprises an entry A2 and an exit A3. Both the entry A2 and the exit A3 are defined by a point wherein the ink 126 is pressed between the ribbon 20 and the squeeze ink roller 13. In one embodiment, distance between A2 and A3 along a plane perpendicular to the longitudinal axis of the squeeze ink roller will be called "the length of the coating zone".

Figure 2:
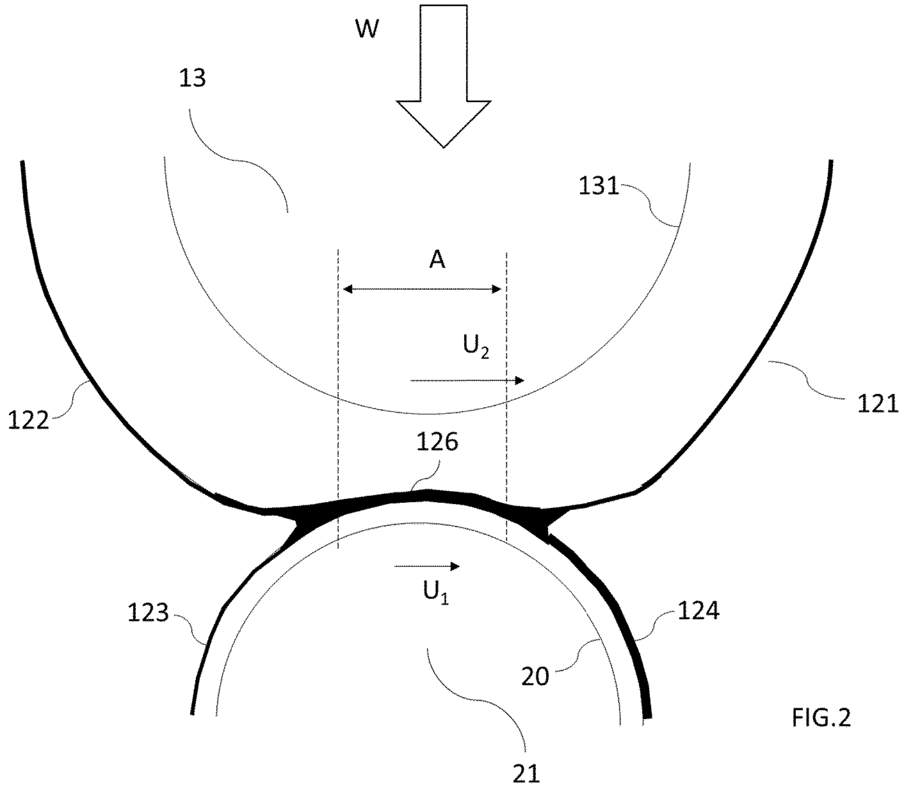
FIG. 2 is a schematic view of the coating zone.

The coating zone of an embodiment of a coating module is illustrated in FIG. 2.

Preferably, the support element 21 is made of metal. One advantage of the metal is that it provides a rigid support to the squeeze roller to squeeze the ink within the coating zone A.

Outer Layer of the Squeeze Ink Roller and Coating Zone

The squeeze ink roller 13 may comprise an outer layer 131. The outer layer 131 is preferably elastically deformable. When the squeeze ink roller 13 is compressed in contact with the ribbon 20 against the support element 21 of the conveyor system 2 holding the ribbon, the outer layer 131 is elastically deformed.

On advantage is to increase the contact surface between the circumferential surface of the squeeze ink roller 13 and the ribbon 20. As explained later, the homogeneity of the transfer is improved by increasing the time during which the ink 126 is subjected to the shear in the contact zone A.

Another advantage is to ensure a level of shear rate to the ink 126 between the ribbon 20 and the squeeze ink roller 13 (i.e., within the nip). The shear applied between the squeeze ink roller 13 and the ribbon 20 allows the transfer of hot melted ink from the squeeze ink roller 13 to the ribbon 20.

Another advantage is the creation of a nip within the coating zone. The coating zone comprises a nip which corresponds to the ink layer between the outer layer of the squeeze ink roller and the ribbon 20. In one embodiment, the coating zone A is defined by the area wherein the thickness of the ink in the nip between the outer layer of the squeeze roller and the ribbon 20 is sensibly constant. Within the nip, the ink 126 is squeezed against the outer surface of the ribbon 20 supported by the support roller 21 and the squeeze ink roller 13, applying the ink to the ribbon's surface.

The ink 126 is squeezed and shaped as a film through the nip during the conveyance of the endless ribbon. The nip may also be defined by the area wherein the outer layer is elastically deformed by the contact with the ribbon supported by the support roller 21.

In one embodiment, the outer layer 131 is made of elastomers or rubber. One advantage of an elastomer is that it allows a high uniaxial compression, increasing the coating zone A between the circumferential surface of the squeeze ink roller 13 and the ribbon 20. When ink is added to the system, the presence of the ink 126 within the nip further increase the length of the coating zone A. Once a threshold of pressure is reached, the thickness of the ink 126 within the nip reaches a limit and the length of the coating zone increases.

In a first embodiment, the circumferential surface of the squeeze ink roller 13 is made by the outer layer 131. The hot melted ink is then transported by the elastic material. Another advantage of an outer layer 131 made of elastomers is that elastomer has a high wettability (degree of wetting) enabling the hot melted ink to maintain contact with the circumferential surface, resulting from intermolecular interactions. The hot melted may be driven by the wettability of the circumferential surface of the squeeze ink roller 13 depending on the polarity of the hot melted ink. In other words, the melted ink 122 may temporarily adhere to the circumferential surface of the squeeze ink roller 13 or its outer layer 131 thanks to intermolecular interactions.

The thickness of the outer layer 131 is preferably ranging from 1 mm and 8 mm, more preferably between 2 and 5 mm.

The outer layer 131 may comprise or may be made of elastomers. The outer layer is preferably made of or comprises a rubber (natural rubber or synthetic rubber) such as EPDM rubber (for ethylene propylene diene monomer rubber). In one embodiment, the outer layer is made of or comprises HNBR (for hydrogenated nitrile butadiene rubber). One advantage of HNBR is that they have higher thermal and chemical inertia or stability than other synthetic rubbers, which improve the time life of the outer layer.

The hardness of the outer layer 131 preferably ranges from 30 to shore A.

Preferably, the hardness of the outer surface of the support roller 21 is superior to the hardness of the outer layer 131 of the squeeze ink roller 13.

In another alternative embodiment, the squeeze ink roller comprises an outer film (non-illustrated), radially disposed on the outer layer 131. The hot melted ink is then transported by the outer film. The outer film can be made of elastomers or be made of any material which is flexible enough to follow the deformation of the outer layer 131 and which has a surface tension enabling the transport of hot melted ink thereon. In this embodiment, the outer layer 131 may be disposed on or located around the circumferential surface of the outer layer 131.

Preferably, the circumferential surface of the squeeze ink roller 13 is not a textured surface. The circumferential surface of the squeeze ink roller is preferably a smooth surface. Preferably, the circumferential surfaces of both the squeeze roller and the support roller are smooth surfaces. In one embodiment, the ribbon inner face and outer face are smooth surfaces.

The expression “smooth surface” must be understood as at least one of the following definitions.

The expression “smooth surface” could be understood as a flat surface.

The expression “smooth surface” could be understood as a surface which does not comprise asperities creating separate pockets in which the ink can be contained.

The expression “smooth surface” could be understood as a surface which does not comprise a rastered or textured surface structure.

The expression “smooth surface” excludes a surface comprises a plurality of depressions designed to be filled with ink or excludes engraved or grooved surfaces. On this purpose, the outer layer 131 does not comprise a plurality of depressions arranged (regularly or not) along the surface of said outer layer 131.

In one embodiment, a “smooth surface” must be understood as a surface roughness Ra inferior to 2 micrometers wherein Ra is defined by the arithmetic average of the deviations from the mean line. Preferably, the roughness Ra of the smooth surface is inferior to 0.5 micrometers.

In one embodiment, a “smooth surface” must be understood as a surface comprising a roughness comprising cavities having a depth inferior to 8 μm, preferably inferior to 2 μm, which gives better results.

The smooth surface advantageously allows the ink to be pressed between the ribbon and the squeeze ink roller outer surface, improving, or impacting the shear stress and/or the shear rate to which the ink is subjected to.

The squeeze ink roller 13 may comprise a rigid core (also called sometimes “rigid frame”). The outer layer 131 is arranged on the rigid core or radially on the outer side of the rigid core. The rigid core advantageously provides a rigid support to the outer layer 131, increasing the squeezing of the ink in the coating zone A. In one embodiment, the circumferential surface of the rigid core is in contact with the outer layer 131. Preferably, the circumferential surface of the rigid core comprises a coating. Said coating of the rigid core may have a wettability sensibly equal to the wettability of the material of the outer layer 131. One advantage is that the transport of the ink is still ensured if a portion of the outer layer 131 is worn away. If a hole is formed through the outer layer 131, the coating of the rigid core will ensure the wettability of the circumferential surface through the hole formed in the outer layer 131 and ensure the transport of ink in all the circumferential surface of the squeeze ink roller. The lifetime of the coating module is then advantageously improved. Preferably, the rigid core is made of a material comprising a metal or a metal alloy such as aluminum.

According to one embodiment, the squeeze ink roller 13 is a drive roller. The coating module 10 may further comprise a motor to rotate the drive squeeze ink roller 13 and a speed controller COs coupled to said motor. The speed controller COs may then control the speed of rotation of the squeeze ink roller 13. At least one battery or an electrical alimentation may be implemented in the coating module 10 to provide power supply to the first motor.

Reservoir Assembly and Rollers

The coater module 10 comprises a reservoir 11 (also called a reservoir assembly 11). In one embodiment, the reservoir 11 is intended to hold hot melted ink 12 thereon.

In a first embodiment illustrated in FIG. 1A and FIG. 1B, the squeeze ink roller 13 is intended to be in contact with hot melted ink 12 in the reservoir 11 to transport said ink on its circumferential surface. The squeeze ink roller 13 may be arranged at least partially within the reservoir 11. The squeeze ink roller 13, by rotation, transports the liquid ink from the reservoir 11 to the ribbon 20. In said embodiment, when the reservoir 11 is filled with ink, the squeeze ink roller is partially immersed within the melted ink 12. By rotating the squeeze ink roller 13, a layer of ink 122 is transported onto the circumferential surface of the squeeze ink roller 13 towards the nip.

Figure 3:
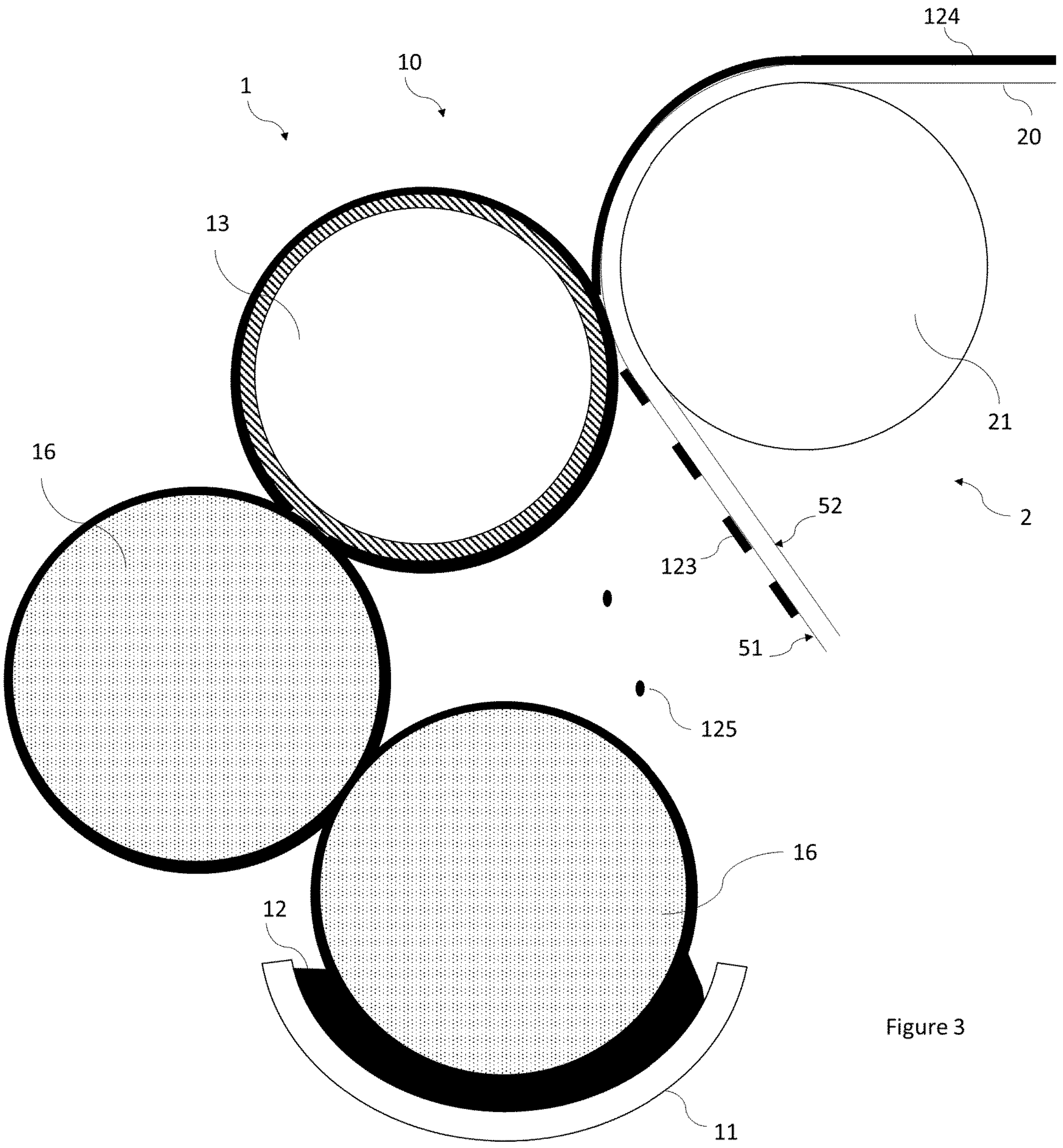
FIG. 3 is a schematic view of a coating module comprising intermediate rollers to transport the ink from the reservoir to the squeeze ink roller.

In a second alternative embodiment illustrated on FIG. 3, the coating module 10 comprises one or several intermediary rollers. One intermediary roller is arranged at least partially within the reservoir 11 to be in contact with ink. The one or several rollers transports the ink from the reservoir 11 to the circumferential surface of the squeeze ink roller 13.

The reservoir 11 may comprise a heating device to melt the ink. In one embodiment, the reservoir 11 may be coupled with a mixing element to keep ink in a predefined physical condition, for example temperature or viscosity. The reservoir 11 can be filled with solid ink or with hot melted ink. The coating module 10 may comprise a device that filled automatically new ink in the reservoir 11 and/or periodically adds new ink in the reservoir 11.

In one embodiment, the reservoir 11 is arranged to receive an excess of ink 125 from the coating zone A.

Other examples of the reservoir assembly are described later in the present description.

Figure 4:
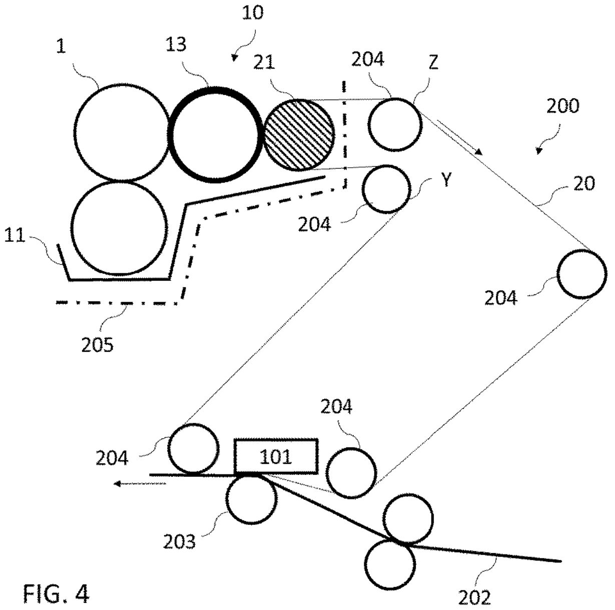
FIG. 4 is a perspective view of a printing apparatus comprising a coating to module according to one embodiment of the invention.

The coating module 10 comprises a conveyor system 2. The conveyor system 2 is designed to hold and transport a ribbon 20. As illustrated in FIG. 4, the conveyor system 2 preferably comprises rollers 204 holding and transporting, directly or indirectly the ribbon 20 along a predefined path. At least one of these rollers could be a drive roller. The drive roller of the conveyor system comprises a motor to control the speed of the ribbon and is connected to the speed controller COs. Preferably, the drive roller is the support roller 21 of the conveyor system 2.

Conveyor Belt

In one embodiment illustrated in FIG. 1A, the conveyor system 2 comprises a conveyor belt 23. The conveyor belt 23 is designed and arranged to hold and transport the ribbon 20 along at least the coating zone A.

The conveyor belt 23 fulfills the same function as a continuous track driving the ribbon 20 in one direction of rotation. In one embodiment, the conveyor belt is an endless conveyor belt. The inner face of the ribbon 20 is held on the outer surface of the conveyor belt 23. The conveyor belt may be supported and transported by rollers.

The conveyor belt 23 supports a portion of the ribbon 20 during its movement, reducing the tension along the ribbon 20. This supporting function of the conveyor belt 23 aims to offer better distribution of the tensions that apply on the ribbon 20. The conveyor belt 23 advantageously provides more design freedom than a roller to transport the ribbon. The conveyor belt 23 can support the ribbon 20 over a longer length. The tension, that drives the ribbon can be taken by the conveyor belt 23 instead of the ribbon 20 itself. Therefore, the tension in the conveyor belt 23 can be different, in most of the cases higher, than the tension in the ribbon 20. Moreover, the use of a conveyor belt 23 reduces the risk of wrinkling and of misalignment of the ribbon 20.

The conveyor belt 23 may comprise a plastic band arranged around at least two rollers, preferably at least three rollers. At least one of these rollers is a drive roller. In other embodiments, the conveyor belt 23 may be made in or comprises any flexible material such as an elastomer, a thermosetting resin or a thermosetting plastic such as polyimide, a cork band or a sheet of metal, such as stainless steel or titanium. In one preferred embodiment, the conveyor belt 23 comprises a coated metal band. The metal band may be coated with a material ensuring stickiness or adherence to the ribbon 20. Said coating comprises preferably a plastic material, for example silicone. In such embodiment, the coating ensures the stickiness with the ribbon 20 and softness to avoid deterioration of the ribbon 20. The metal band ensures the stiffness of the conveyor belt.

In one alternative embodiment illustrated in FIG. 1B, the coating module does not comprise a conveyor belt. The ribbon is transported and supported by rollers 21 of the conveyor system.

In one embodiment, the support roller 21 of the conveyor system 2 comprises an outer film of elastic material. The thickness of the outer film of the support roller may be inferior to 2 cm or inferior to 2 mm. Preferably, the thickness of the outer film is comprised between 500 μm and 5000 μm, more preferably between 2000 μm and 4000 μm. In one embodiment, the outer film of the support is made of EPDM rubber (for ethylene propylene diene monomer rubber) or HNBR (for hydrogenated nitrile butadiene rubber). In one embodiment, the outer film of the support is made of Silicone rubber VMQ (for vinyl methyl silicone or vinyl ethyl silicone). One advantage of such silicone rubber is that VMQ can withstand a wide temperature range.

Said outer film of material, allows to protect the conveyor belt 23 or the ribbon 20 from friction wear by the support and advantageously increases the lifetime of the coating module 10.

Pressure Control

The coating module 10 further comprises an active element 14. The active element 14 is designed for pressing the squeeze ink roller 13 against the support roller 21. Preferably, the squeeze ink roller 13 is pressed against the portion of the ribbon 20 supported by the support roller 21. One advantage is that the pressure will cause the outer layer 131 to be deformed, squeezing the ink 126 within the nip against the ribbon 20.

Said pressure may allow squeezing the ink 126 between the circumferential surface of the squeeze ink roller 13 and the ribbon 20. Advantageously, both parameters combined: the pressure and the difference in speed between the ribbon 20 speed and the tangential speed of the circumferential surface of the squeezed ink roller may advantageously allow the coating of a thin layer of ink on the outer surface of the ribbon 20.

One advantage is the deformation of the outer layer 131 increases the contact zone wherein the ink is squeezed between the squeeze ink roller 13 and the ribbon 20.

The coating module 10 further comprises a pressure controller COp. The pressure controller COp comprises the active element 14 for actively pressing the squeeze roller against the support roller 21 and/or against the support of the conveyor system 2. The pressure controller COp may control the force W applied to the squeeze ink roller 13 against the conveyor system 2 or against the support 21 of the conveyor system 2 or vice versa.

The active element 14 may modify the pressure applied on ink between the squeeze ink roller 13 and the ribbon 20 or the conveyor system 2 along the coating zone A.

The pressure controller COp controls the active element 14 to controls the force W applied to the squeeze ink roller. The control of the pressure or the shear applied on ink 126 on the coating zone A advantageously allows controlling the thickness of the layer of ink coated on the ribbon 20. Another advantage is to allow keeping the thickness of ink coated on the ribbon constant when the speed of the ribbon 20 is modified.

The pressure controller COp may be configured to control the pressure to deform the outer layer 131 in the coater zone in accordance with its predefined hardness or elasticity. The pressure controller COp allows controlling the nip or the length of the coating zone A. Said length ensures that the circumferential surface of the squeeze ink roller 13 slides on the ribbon 20 during a predefined time to ensure the transfer of the ink from the squeeze ink roller 13 to the ribbon 20. Indeed, the higher the pressure, the more the elastic deformation of the outer layer 131, and the more the length of the coating zone A is.

The pressure controller COp may be configured to automatically adjust the pressure between the squeeze ink roller 13 and the ribbon 20.

The pressure controller COp may be configured to automatically adjust the force W or the pressure to modify the thickness of ink coated on the ribbon 20 keeping the ribbon 20 speed constant. One advantage is to modify the thickness of coated ink 123 without modifying the ribbon 20 speed or the tangential speed of the ink roller.

In one embodiment, the active element 14 may comprise a linear slide. The squeeze ink roller 13 may be mounted in translation along a linear slide and the pressure controller COp may control the position of the squeeze ink roller 13 along said linear slide. The position of the squeeze ink roller 13 may be controlled with a motor or with a spring-loaded element, or other means known by the skilled person to perform this function. The control of the position of the squeeze ink roller 13 may control the force applied to the squeeze ink roller 13 against the support roller 21. Reducing the distance between the center of the squeeze ink roller 13 and the conveyor system 2 (e.g., the center C1 of the support roller 21) increases the force applied against the squeeze ink roller 13.

The support roller 21 acts as a stopper to the movement of the squeeze ink roller 21.

The pressure applied by the squeeze ink roller 13 on the ribbon 20 advantageously ensures a shear rate on ink 126 in the coating zone when the circumferential surface of the squeeze ink roller 13 slides on the ribbon 20. The shear applied between the squeeze ink roller 13 and the ribbon 20 allows the transfer of hot melted ink from the circumferential surface of the squeeze roller to the ribbon 20.

In another example, the active element comprises magnetic means to apply a force on the squeeze ink roller 13 in the direction of the conveyor system 2 or in the direction of the support of the conveyor system 2.

In an alternative embodiment, the pressure controller COp and the active element control a force applied to the support 21 in the direction of the squeeze ink roller 13.

Speed Control

In one embodiment, the coating module 10 comprises a speed controller COs to operate various components of the coating module 10, including the squeeze ink roller 13 and the drive roller of the conveyor system 2.

The speed controller COs comprises the motor for controlling the first speed $U_1$ of the ribbon 20. As described above, said motor is preferably configured to drive the rotation of the support roller 21 or to drive the rotation of another roller 204 of the conveyor system. The speed controller COs further comprises a second motor for controlling a speed of rotation of the squeeze ink roller 13. The control of the speed of rotation of the squeeze ink roller allows controlling a second tangential speed $U_2$ of the squeeze ink roller 13 (also called second speed in the present description). By "the tangential speed of the squeeze roller", it should be understood the tangential speed of the circumferential surface of the squeeze ink roller 13, preferably along the coating zone A.

One advantage is to control the speed of both the ribbon 20 and the squeeze ink roller 13, optionally to create a shear rate on ink 126. Said shear rate directly depends on the ratio between the first speed $U_1$ of the ribbon 20 and the second speed $U_2$ of the squeeze ink roller 13. Said shear rate also directly depends on the pressure applied to the ink squeezed between the ribbon 20 and the squeeze ink roller 13.

In one embodiment, the speed controller COs comprises at least one pre-stored program.

The pre-stored program may comprise instructions to control the first speed $U_1$ of the ribbon 20 and the tangential speed $U_2$ of the squeeze ink roller 13 in such a way the speed $U_2$ of the squeeze ink roller 13 is inferior or superior to the speed $U_1$ of the ribbon 20. Said pre-stored program may comprise instructions to maintain the ratio of the speed $U_1$ of the ribbon over the tangential speed $U_2$ of the squeeze ink roller 13 constant.

The pre-stored program may comprise instructions to automatically adjust the tangential speed $U_2$ of the squeeze ink roller 13 when the speed $U_1$ of the ribbon 20 is constant to modify the thickness of the layer of ink coated 124 on the ribbon 20. The coating module 10 according to said embodiment advantageously allows modifying the thickness of ink on the ribbon 20 with the same speed as the ribbon 20.

Preferably, the pre-stored program comprises instructions which, when implemented by the speed controller COs, lead to control the first speed $U_1$ of the ribbon 20 to be sensibly equal to the tangential speed $U_2$ of the squeeze ink roller 13.

When the first speed $U_1$ and tangential speed $U_2$ of the squeeze ink roller 13 are equal or sensibly equal, it advantageously reduces the damage to the rollers and improve the time of life of the coating module.

For sack of clarity, the figures illustrate the direction of rotation or of movement but does not illustrate the direction vectors.

Coating Process

Figure 7:
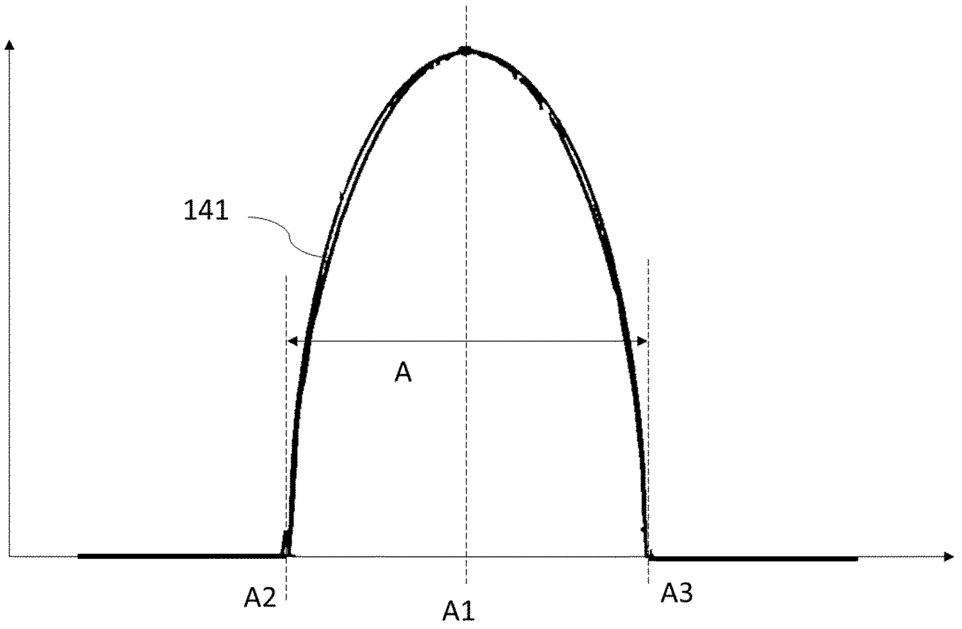
FIG. 7 is a graph showing the pressure profile of the ink along the coating zone on a plane which is perpendicular to the longitudinal axis of the squeeze ink roller or of the support roller.

The coating process according to the invention is now described in reference to FIG. 7.

The pressure applied to the ink within the coating zone depends on several factors: the roughness of the surface of both the squeeze ink roller 13 and the support roller 21, the elasticity of the outer layer 131 of the squeeze ink roller 13.

Because the pressure W is applied between the two rollers 13, 21, the pressure applied to the ink in the coating zone A reaches a global maximum at a point A1 of maximum pressure corresponding to the ink in the axis through the center C1 of the support roller 21 and the center C2 of the squeeze ink roller 13.

In one embodiment, the force applied by the pressure controller to the squeeze ink roller 13 to create that pressure W ranges from 40 kPa to 500 kPa.

The center C1 is preferably defined in the longitudinal axis of rotation of the support roller 21. The center C2 is preferably defined in the longitudinal axis of rotation of the squeeze ink roller 13.

The surface the squeeze ink roller 13 and/or the support roller 21 are designed in such a way that the pressure reaches a maximum at the point A1 of maximum pressure and are designed in such a way that said pressure applied to the ink in a plane perpendicular to the longitudinal axis of the support roller or the squeeze ink roller along the coating zone in monotonic on both sides of said point A1 of maximum pressure.

In one embodiment, the circumferential surface of the support element (e.g., the support roller 21) is a smooth surface as defined previously.

Preferably, from the entry A2 to the exit A3 of the coating zone A, the pressure or the stress applied to the ink 126 monotonically increases because of the deformation of the outer layer 131 of the squeeze ink roller until reaching the point A1 of maximum pressure wherein the deformation of the outer layer 131 of the squeeze roller is at its maximum and monotonically decreases until the exit A3 of the coating zone A.

This pressure profile 141 is reached by the already-described profile of roughness of both the squeeze roller 13 and the support roller 21. One further advantage of the elastic outer layer of the squeeze ink roller is that the pressure applied will flatten said outer layer leading to the described pressure profile.

Indeed, because the squeeze ink roller 13 nor the support roller 21 does not comprise depressions or cavities, the pressure profile is monotonically increasing or decreasing until the point A1 of maximum pressure. This roughness avoids obtaining a profile comprising a plurality of local maximum between 2 cavities and a plurality of local minimum in the middle of each cavity.

Preferably, the inner face 52 and the outer face 51 of the ribbon 5 further comprise roughness without cavities or depression to retain ink thereon and may comprise smooth surfaces as defined previously.

However, the Young modulus of the ribbon 20 is far superior to the Young modulus of the outer layer 131 of the squeeze ink roller 13. For example, the Young modulus of the ribbon ranges from 1 to 5 GPa and the Young modulus of the outer layer 131 ranges from 1 to 10 Mpa. Therefore, the asperities of the surface of the ribbon 20 is not a problem. The elasticity of the ribbon 20 allows to flatten said ribbon within the coating zone.

Such pressure profile 141, combined with the temperature does advantageously contribute to the change of the behavior of the melted ink and decrease the viscosity of said ink.

Indeed, because the ink has a shear thinning behavior, the highest the pressure applied to the ink is, the more the viscosity of ink decreases.

The advantage of the elastic layer on the squeeze ink roller is that the pressure profile applied to the ink between the squeeze ink roller and the ribbon along the coating zone in a plane perpendicular to the longitudinal axis of rotation of the squeeze roller presents a shape of symmetric bell curve or a parabolic shape at least in a center portion of the coating zone A. Therefore, it ensures that the pressure applied remains during a certain time above a threshold corresponding to a sufficient pressure allowing to reduce the viscosity of the ink. Reducing the viscosity advantageously allows to reduce the thickness of the ink coated layer on the ribbon at the exit of the coating to zone.

Such pressure applied to the ink 126 during a sufficient length D or time advantageously improves the control of the coating and allows coating at very thin layer such as inferior to 10 μm. Furthermore, said coating is also performed when the ribbon is driven at low speed of transport, e.g., below 1 m/s.

In one embodiment, the viscosity may also be controlled by adjusting the temperature of the melted ink (as described later).

In one embodiment, the pressure applied to the ink may be increased by driving the first speed $U_1$ at a speed different from the second speed $U_2$.

Temperature Control

In one embodiment, the temperature of the ink transported by the squeeze ink roller 13 is controlled by a first heater. Preferably, the coating module 10 comprises a heater to heat the ink on the squeeze ink roller 13. Said heater may be arranged inside the squeeze ink roller 13 to heat the ink on its circumferential surface. The control of the temperature of the ink on the squeeze roller ensures the control of the viscosity of the ink on the coating zone A.

In one embodiment, the temperature of the ribbon 20 on the coating zone A is controlled by a second heater. Preferably, the conveyor system 2 comprises a second heater to heat the ribbon from its inner surface, optionally through the conveyor belt 23. The heater may be arranged in the support element of the conveyor system 2, such as the support roller 21. The control of the temperature of the ribbon 20 allows controlling the temperature of the ink squeezed between the ribbon 20 and the squeeze ink roller 13 on the coating zone A. Optionally a second heater may be arranged in the path of the ribbon adjacent or in the vicinity of the coating zone A. Said embodiment advantageously allows the heating of the ribbon before arriving in the coating zone A, improving the control of the temperature of the ink squeezed in the coating zone A.

The heaters advantageously allow to pre-heat the support roller 21, the squeeze ink roller 13 and/or the endless ribbon.

Figure 5:
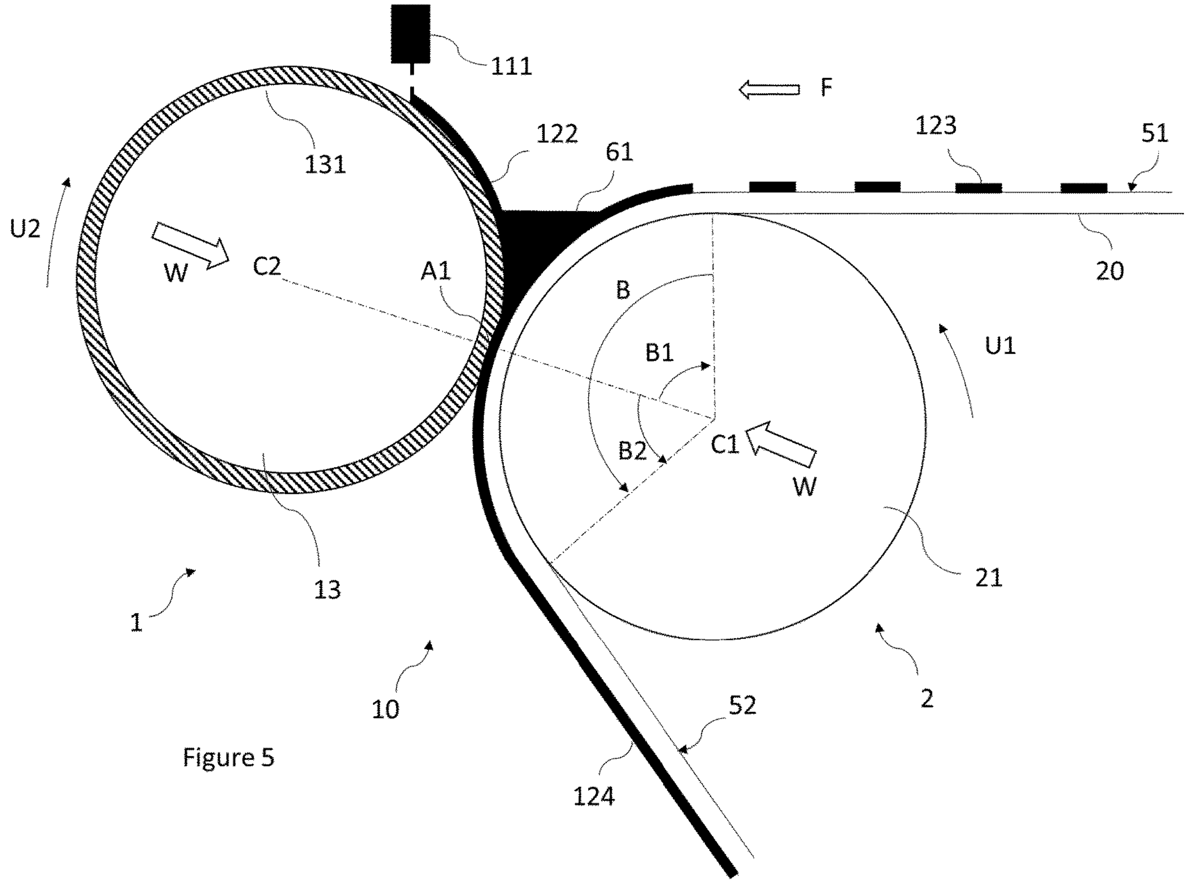
FIG. 5 is a schematic view of a coating module according to another embodiment of the invention wherein the reservoir comprises means to provide ink on the circumferential surface of the squeeze ink roller.
Figure 6:
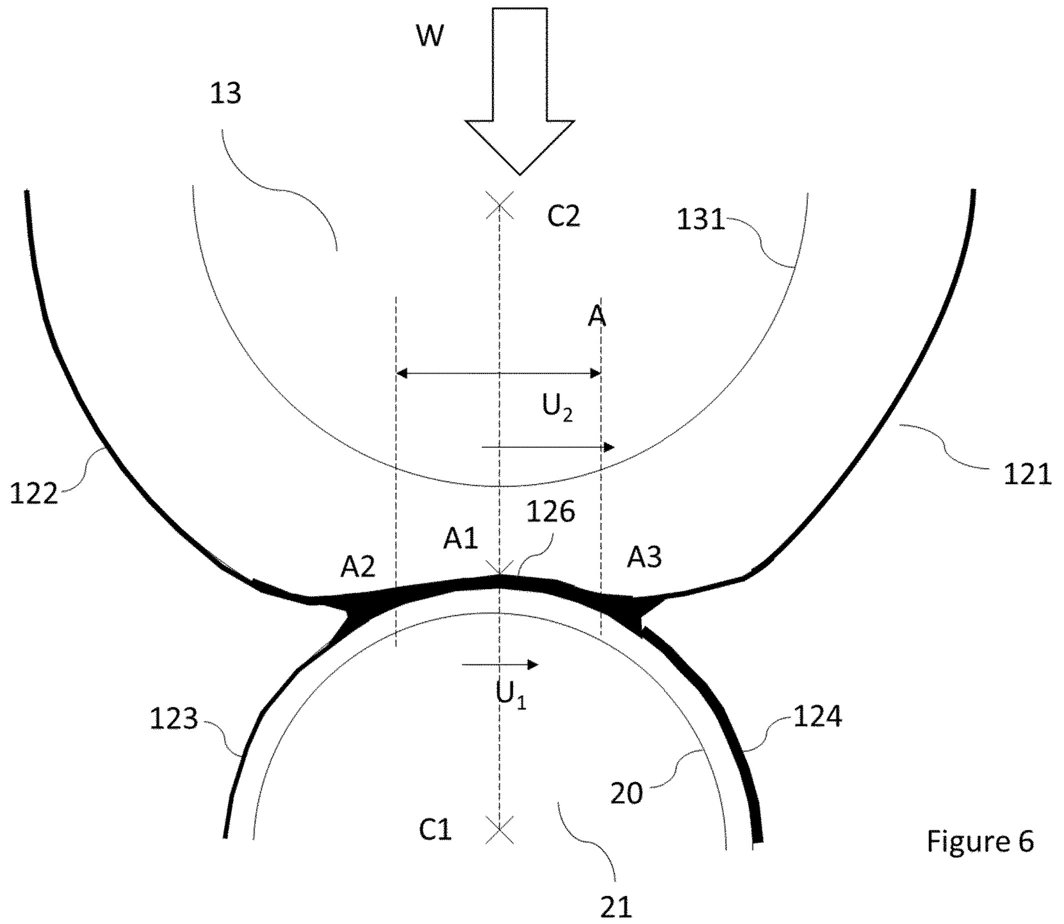
FIG. 6 is another schematic view of the coating zone according to one embodiment of the invention.

As illustrated in FIG. 5, the conveyor system 2 is arranged in such a way that the ribbon 20 is supported by the support roller 21 along an angle B covering the coating zone A and the point A1 of maximum pressure.

The ribbon 20 is supported by the support roller 21 along a distance from the point of first contact with the support roller 21 to the point A1 of maximum pressure along an angle B1. Along this distance, the remaining ink 122 is heated by the support roller 21 as explained above.

The ribbon 20 is supported by the support roller 21 from the point of maximum pressure to its separation with the support roller 21 along an angle B2. Along this distance, the layer of coated ink 124 is heated by the support roller trough the ribbon 20. Heating the layer of coated ink after its passage in the coating zone A advantageously maintains the ink layer melted which improves the uniformity of the layer of coated ink 124.

Preferably, the angle B1 ranges between 10° and 90°.

Preferably, the angle B2 ranges between 10° and 90°.

The angle B1 depends directly on the relative position of the support roller 21 in respect with the previous roller Y of the conveyor system 2 supporting the ribbon 20.

The angle B2 depends directly on the relative position of the support roller 21 in respect with the succeeding roller Z of the conveyor system 2 supporting the ribbon 20.

The terms "previous roller" and "succeeding roller" should be understood here as the closest rollers of the conveyor system 2 supporting the ribbon 20 respectively before and after the support roller 21 according to the direction of transport of the ribbon 20.

In one embodiment illustrated in FIG. 4, the coating module 10 comprises a thermal enclosure. The thermal enclosure may comprise isolating walls 205. The thermal enclosure is arranged to thermally isolate the coating module 10. Apertures may be managed in the thermal enclosure for the passage of the ribbon 20 through the thermal enclosure.

The thermal enclosure allows improving the control of the temperature of the ink 126 squeezed or located between the ribbon 20 and the squeeze ink roller 13. This control of the temperature advantageously ensures a homogeneous viscosity of the molten ink squeezed in the coating zone A improving the control of the thickness of ink coated onto the ribbon 20.

The heater to control the temperature of this zone is preferably connected to a controller COs, COp. The control of the temperature advantageously allows the control of the viscosity of molten the ink 12 on the coating zone A and improves the control of the coating.

Nip Between the Rollers

The reservoir assembly may comprise any means designed and arranged to stock melted or solid ink thereon and to feed the circumferential surface of the squeeze ink roller with said ink in a melted state.

Another embodiment of a coating module according to the invention is described hereafter in reference to the FIG. 5.

In this embodiment, the reservoir assembly comprises a device 111 to apply ink on the outer surface of the squeeze ink roller. In one embodiment, said device 111 may comprise a slot-die device.

In one embodiment, the contact between the squeeze ink roller 13 and the ribbon 20 supported by the support roller 21 feed the ink molten pool 61. The ink molten pool 61 is an amount of excess of melted ink at the junction between the ribbon supported by the support roller 21 and the squeeze ink roller 13. Indeed, when the melted ink fed to the coating zone (by both the melted ink 122 provided by the squeeze ink roller 13 and the residual ink 123 provided by the ribbon) is higher than the quantity of ink (121, 124) exiting from the nip, the excess of ink accumulates in the ink molten pool 61.

Creating such ink molten pool 61 advantageously improves the quality of coating. Indeed, it creates a buffer volume of ink, allowing compensating occasional variations of quantity of ink provided to the coating zone A. Furthermore, it advantageously accelerates the melting of the residual ink 123 in the ribbon 20 because said ink is submerged by melted ink.

Said nip comprises the ink within the coating zone between the squeeze ink roller and the support roller and further comprises the ink molten pool 61 which is fluidly connected to the ink within the coating zone.

Another advantage is to allow quick acceleration of the speed of the ribbon U1 without lacking melted ink in the nip.

Such ink molten pool 61 is common to all embodiments described in the present description and is not limited to this reservoir assembly.

In one embodiment, the reservoir assembly 11 further comprises an ink sensor (non-illustrated). The ink sensor is designed to detect when the level of melted ink within the ink molten pool 61 reaches a predefined threshold. Preferably, the reservoir assembly 11 further comprises an ink controller. The ink controller is configured to receive a signal from the ink sensor comprising the data sensed by the ink sensor. The ink controller is configured to control the amount of ink 122 added to the ink molten pool 61 by the squeeze ink roller 13.

In one embodiment the device 111 comprises means to automatically add new solid ink within the reservoir 11 of melted ink when instructions are received from the ink sensor.

In another embodiment, the device 111 comprises means to melt a piece of solid ink and is arranged in such a way that the melted ink is dropped onto the outer surface of the squeeze ink roller or within the ink molten pool 61. Said dropping device may comprise means to automatically add new melted ink within the ink molten pool 61 when instructions are received from the ink sensor.

This embodiment advantageously allows to control the amount of ink which is melted to reduce or increase the level of ink within the ink molten pool 61.

The second threshold preferably corresponds to a level of ink superior to the level of melted ink in the ink molten pool 61 corresponding to the first threshold.

The ink sensor may comprise a weight sensor. In another embodiment, the ink sensor comprises an optical sensor. The optical sensor may comprise an emitter of light and a receptor to receive the light generated by the emitter and reflected by the surface of the liquid ink in the reservoir. The optical ink sensor may be configured to determine a level of liquid ink in the reservoir by the time of flight of the light detected.

In an alternative embodiment, the ink sensor comprises at least 2 electrodes arranged to measure an electrical conductance. Preferably, one electrode is arranged to be partially immersed within the liquid ink in the ink molten pool 61 and at least one second electrode is arranged to be in contact with liquid ink at a predefined level of ink within the ink molten pool 61. Therefore, the level of the ink within the ink molten pool 61 depends on the electrical conductance measured between the two electrodes. The ink sensor may comprise a plurality of second electrode, each arranged to be in contact with melted ink at another predefined level of ink within the ink molten pool 61. The detection of an electric conductance between the first electrode and a second electrode advantageously means that the level of ink within the ink molten pool 61 reaches the predefined threshold associated with this second electrode.

The ink sensor may also comprise a capacitance sensor to measure the level of ink within the ink molten pool 61. The ink controller may be associated with a memory. Said memory is connected to the ink controller. Said memory comprises instructions which, when executed by the controller, provides the controller to implement the described method.

The ink controller may be associated with a memory. Said memory is connected to the ink controller. Said memory comprises instructions which, when executed by the controller, provides the controller to implement the described method.

In another embodiment, the reservoir assembly comprises a container holding elements of solid ink and the reservoir assembly further comprises means to transport at least one element of solid ink from the container to the ink molten pool 61. As in the previous embodiments, said means to transport the elements of solid ink may be controlled by the ink controller. In such a way, the element of solid ink is transported into the ink molten pool 61 when the sensor detects that the level of melted ink in the ink molten pool 61 reaches a predefined threshold.

In another embodiment, the ink controller is configured to control the ink of the reservoir of melted ink illustrated in FIGS. 1A and 1B and is configured to control the amount of new ink added in such reservoir.

Printing Apparatus

According to another aspect, the invention relates to a thermal transfer printing apparatus comprising a coating module 10 as described in the present description. A thermal transfer printing apparatus according to one embodiment of the invention is illustrated in FIG. 4.

The printing apparatus may comprise a printhead, and a conveyor system 2 to transport a ribbon 20 from the coater to the printhead. Preferably, the conveyor system 2 transports from the printhead to the squeeze ink roller 13 the ribbon 20 after printing in a cyclic manner, as illustrated in FIG. 4. The conveyor system may comprise the support roller 21 of the coating module and a plurality of rollers to hold and support the ribbon 20.

Once the ribbon 20 is in contact with a substrate 202 to be printed, a part of the ink is transferred from the ribbon 20 to the substrate 202, the portion of the ribbon where ink has been partially removed during transfer printing is then transported to the coater again to be re-coated or re-inked.

In one embodiment, the delivery of data to be printed by the printhead is received from a memory. The data flow is preferably sequenced by a calculator in function of the printing speed. The data can be changed during the printing process while the ribbon 20 and substrate 202 continue to move at the same speed.

In one example, the controllers may receive commands from a control interface such as a button ON/OFF or printing mode instructions or settings.

The printing apparatus 200 comprises a printhead 101. In one preferred embodiment, the printhead 101 is a thermal transfer printhead.

In a first mode, the printhead is in contact with the inner face of the ribbon 20 to enable the thermal transfer of the ink located in the outer face of the ribbon 20. During this printing process, the outer face of the ribbon 20 is in contact (preferably in pressurized contact) with a substrate 202 to transfer the part of ink intended for printing the substrate.

In a second mode, the printhead 101 is not in contact with the ribbon 20. This mode may be engaged when the printing apparatus is switched off or between two successive printing sequences. The alternance of the first and second mode may be configured depending on the printing mode.

At least one print roller 203 can be used to transport a substrate 202 proximate to the ribbon 20. The thermal transfer printhead 101 is preferably in the vicinity of the substrate 202 and is used to transfer the coated layer of ink 124 from the ribbon 20 to the substrate 202. The arrangement between the printhead 101, the ribbon 20 and the substrate 202 may be ensured by mechanical components which are precisely set according to a desired printing precision. Some guides and position control components may be implemented in order to ensure a predefined arrangement between at least the printhead 101 and the ribbon 20.

The print roller 203 ensures a sufficient pressure on the substrate 202 in order to maintain the substrate 202 in contact with the ribbon 20 when printing process is engaged. In this configuration, said ribbon 20 is maintained in a moving sandwich layer between the substrate 202 and the printhead 101 during the printing process. The movement of the substrate 202 is in the same direction as the displacement direction of the ribbon 20 in the vicinity of the printhead. This movement in the vicinity of the printhead is preferably a rectilinear movement.

The ribbon 20 of the coating module 10 preferably forms a loop. In such configuration, the residual ink 123, not used during the printing process, is conveyed from the printhead to the coating zone A to be re-inked. In consequence, the same ribbon 20 is used continuously for conveying ink for printing and for conveying residual ink after the printing to the first portion to be re-coated. The printing process is implemented such as to form a continuous looping process (i.e., cyclic manner) where residual ink is re-used automatically. This configuration allows re-using ink which has not been printed.

One advantage is to provide and autonomous printing apparatus where at least a part, preferably 100% or substantially 100% of the ink is used, i.e., without ink loss, especially during multiple cycles.

The ribbon 20 can be made of various materials. The ribbon 20 is preferably made of a material with high temperature resistance properties, such as temperature resistance up to 300° C., and high chemical resistance properties, for example a chemical resistant to alcohol, ink or solvents, etc. Preferably, the ribbon 20 is made of polyimide. The polyimide allows the ribbon to be used at temperatures up to the range [340°-380° ] of temperatures without undergoing deformation. The ribbon 20 may also be made of metal or metal alloy such as titanium alloy.

The ribbon 20 is preferably made of a material that has a heat transfer rate greater than 0.120 Watts/meter-Kelvin.

The thickness and the composition of the ribbon material is designed to create heat transfer through the ribbon 20 allowing the printing.

Preferably, the thickness of the ribbon 20 is inferior to 50 μm or to 20 μm. Said thickness advantageously allows better thermal conduction through the ribbon. The thickness of the ribbon 20 may be comprised between substantially 0.5 μm and 50 μm, most preferably between 0.5 μm and 20 μm. In one example, the thickness of the ribbon 20 is chosen in the range [3-25 μm] or [5-10 μm].

The ribbon 20 is designed to retain molten ink on its outer surface. The outer face of the ribbon 20 is designed to retain ink on its surface.

For this purpose, the ribbon is a non-porous ribbon. The ribbon or its outer face is preferably hermetic to fluids. Even when the ribbon 20 is pressed between the squeeze ink roller 13 and the support roller 21, the composition of the ribbon 20 enables the ink to penetrate in the volume of the ribbon 20. In one other embodiment, the width of the ribbon is higher than the width of both the support roller and the squeeze ink roller. Therefore, during the coating, the inner face of the ribbon does not contain ink thereon, which would be harmful to the printhead.

In one embodiment, the ribbon does not comprise textiles or fabric.

Control of the Reservoir

In the embodiment illustrated in FIGS. 1A and 1B, the amount of ink transported by the squeeze ink roller 13 depends on the angle between the circumferential surface of the squeeze ink roller 13 and the level of ink in the reservoir 11. The coating module 10 preferably comprises a level controller COi to control the angle between the level of hot melted ink within the reservoir 11 and the circumferential surface of the squeeze ink roller 13. Said level controller COi may comprise a device that automatically adds new ink in the reservoir 11 according to the level of ink and the angle formed by that level and the squeeze ink roller 13. In another embodiment, the level controller may control the position of the reservoir 11 relative to the squeeze ink roller 13. By "the angle between the circumferential surface of the squeeze ink roller 13 and the level of ink in the reservoir 11", it should also be understood the angle between the circumferential surface of the intermediary roller and the level of ink in the reservoir 11 when an intermediary roller transport hot melted ink from the reservoir 11 to the squeeze ink roller 13.

In one embodiment, the angle between circumferential surface of the squeeze ink roller and the level of melted ink within the reservoir 11 is defined by the angle between a horizontal axis and the tangent at the surface of the squeeze ink roller at the point of contact with the melted ink.

The speed controller COs, the pressure controller COp and/or the level controller COi includes a hardware processor and software to respectively control the speed of the ribbon 20 and of the squeeze ink roller 13, controlling the force applied to the squeeze ink roller 13 to squeeze the ink on the coating zone A and/or controlling the level of ink within the reservoir 11.

Operation

The operation of a coating module 10 according to the above description is now described.

On a first step, the squeeze ink roller 13 being in contact with the ribbon transports some ink on its circumferential surface to the ribbon. The squeeze ink roller may be in contact with hot melted ink within the reservoir 11 or may be in contact with one or several intermediary rollers transporting hot melted ink from the reservoir 11 to the circumferential surface of the squeeze ink roller 13.

On a second step, the hot melted ink is carried by the squeeze ink roller 13 to the coating zone A. Along the coating zone A, the tangential direction of movement of the squeeze ink roller 13 is substantially the same as the direction of movement of the ribbon. The ribbon 20 may be transported by the conveyor system 2 at a first speed $U_1$ which is inferior or superior to the tangential speed $U_2$ of the squeeze ink roller 13. Preferably, the ribbon 20 may be transported by the conveyor system 2 at a first speed $U_1$ which is equal or sensibly equal to the tangential speed $U_2$ of the squeeze ink roller 13. Furthermore, a force is applied to the squeeze ink roller 13. Said force is applied in the direction of the coating zone A or in direction to the support roller 21 of the ribbon 20. Then, a thickness of ink 126 on the coating zone A is squeezed and coated between the ribbon and the squeeze ink roller 13.

The differential of speeds or/and the pressure create a shear force causing the transfer of ink from the squeeze ink roller 13 to the ribbon 20.

As illustrated in FIG. 2, new ink 122 is provided to the coating zone A by the squeeze ink roller 13. In one embodiment, remaining ink 123 already present on the endless ribbon as residual ink from prior printing operation is also provided in the coating zone by the ribbon 20. The pressure profile on the nip causes the ink to split between the ribbon 20 and the squeeze ink roller 13: a first part of the ink 121 remains on the squeeze roller and a second part of the ink is thinly coated onto the ribbon 20, forming a plain layer of ink 124 spread onto the outer face of the ribbon 20.

The thickness of the layer of ink coated 123 on the ribbon 20 depends on the dynamic viscosity of the ink on the coating zone A, the proportion of the speed variation between the squeeze roller tangential speed $U_2$ over the ribbon speed $U_1$, the radius of curvature of the ribbon 20 along the coating zone A and the force W applied on the squeeze roller.

In a preferred embodiment the length of the coating zone, when a force is applied to the rollers, is at least 1 mm, preferably between 1 mm and 7 mm.

Therefore, the pressure controller COp and/or the speed controller COs may respectively adjust the force applied to the squeeze roller and/or adjust the proportion of the speed variation between the squeeze roller tangential speed over the ribbon speed to modify the thickness of ink coated on the ribbon.

When the coating module 10 is comprised in a thermal transfer printing apparatus, the portion of the ribbon 20 exiting the coating zone A and coated with ink 124 is conveyed by the conveyor system 2 to the printhead for printing. During printing, a portion of the ink 124 is thermally transferred to the substrate and the remaining ink un-transferred remains on the ribbon 20.

The remaining ink 123 which has not been printed is then transported by the ribbon 20 to the coating zone A to be coated again, providing ink-rejuvenation. In one embodiment, the remaining ink 123 on the ribbon 20 is heated between the printhead and the coating zone A, preferably above its melting point. The heating of the remaining ink 123 advantageously melts the ink to provide liquid ink in the ribbon on the coating zone A.

One advantage of the present invention is to handle the thickness of the layer of ink coated 124 on the ribbon, independently of the quantity of remaining ink 132 on the ribbon arriving on the coating zone A.

In one embodiment, the excess of ink 125 in the coating zone A falls back in the reservoir 11 during coating. One advantage is to reuse all ink which has not been printed on the substrate and to reduce the loss of ink.

The present invention advantageously allows controlling the thickness of the layer of ink 124 coated on the ribbon 20 by adjusting the ratio of the speeds of respectively the ribbon and the squeeze ink roller 13 and/or by adjusting the pressure between the squeeze ink roller 13 and the ribbon on the coating zone A.

In one embodiment, the coating module comprises at least one thickness sensor to measure the thickness of the layer of ink 124 coated on the ribbon 20. Said sensor may comprise an optical sensor or a camera. Said thickness sensor may be connected to the speed controller COs and/or to the pressure controller COp to provide information relative to the thickness of the layer of ink 124 coated on the ribbon 20. In one embodiment, the speed controller COs may adjust the first speed and/or the second speed $U_2$ and/or the ratio of the first speed over the second speed $U_2$ depending on the information provided by the thickness sensor. In one embodiment, the pressure controller COp may adjust the force applied depending on the information provided by the thickness sensor.

In one embodiment, the operation of the thermal transfer printing apparatus comprises two modes.

The first mode is a starting mode wherein the ribbon is coated by the coater without implementing the printing process, and the second mode is an operating mode wherein the printhead prints by thermal transfer printing a portion of the ink on the ribbon to the substrate.

The first mode operates at the boot of the thermal transfer printing apparatus when the ribbon is not yet coated.

During the first mode, the coating module must reach an operational temperature before starting. The squeeze roller may be brought in contact with the ribbon. The ribbon speed and the squeeze roller tangential speed ramp up to fixed predetermined speeds. During this ramp up, the squeeze roller gets "wetted" by the hot melted ink and coats the ribbon with said hot melted ink. In one embodiment, the squeeze ink roller and the ribbon speeds ramp up at sensibly the same speed.

In one embodiment, at the fixed predetermined speeds, the ratio of the ribbon speed over the squeeze ink roller tangential speed is fixed to a first predetermined ration. In one embodiment, the first ratio is ranging from 0.95 to 1.05.

In the first mode, the force applied to the squeeze ink roller 13 is fixed to a first predetermined force. In one embodiment the first predetermined force is ranging from 0,005 to 4 N by mm of ribbon width.

In the first mode, there is no printing. Therefore, all the ink coated on the ribbon exiting from the coating zone A remains when the ribbon achieves a cycle and return in the coating zone A. The objective of the first mode is to "wet" the squeeze ink roller and the ribbon with hot melted ink.

Because at the beginning, the temperature and the viscosity of the ink is not stabilized, the first mode is running until the amount of ink on the ribbon entering the coating zone A is the same as the amount of ink on the ribbon exiting the coating zone A.

During the second operating mode, the ribbon speed is adjusted to achieve a print speed. The print speed is superior to the predetermined booting speed. Preferably, the operating ribbon speed is ranging from 0.05 m/s to m/s, preferably from 0.1 m/s to 5 m/s. The squeeze ink roller tangential speed is then adjusted over a transition time to obtain shear conditions favoring the coating.

In one embodiment, the ratio of the ribbon speed over the squeeze ink roller 13 speed is adjusted too to reach a second predetermined ratio. In one embodiment, the second predetermined ratio is ranging from 0 to 0.85 or from 1.1 to 3. One advantage of such speed predetermined ratio, involving the configuration of a ribbon speed which is different of the squeeze roller speed, is that it allows the creation of a shear rate in the coating zone. Such ratio allows coating of the ribbon 20. In the second mode, the force applied to the squeeze ink roller 13 against the ribbon or the support roller is fixed to a second predetermined force. In one embodiment the second predetermined force is ranging from 0.005 N to 0.2 N by mm of ribbon width or ranging from 0.1 N to 4 N by mm of ribbon width. Said force directly modifies the thickness of the outer layer 131 of the squeeze ink roller 13 because of its elasticity or its flexibility. The angular velocity of the squeeze ink roller is then controlled to reach a target tangential speed (which also depends on the radius of the squeeze ink roller and the thickness of its outer layer).

In one embodiment, the level controller COi automatically adjusts the level of ink on the reservoir 11 during the first mode, by automatically feeding the reservoir 11 with new ink. Once in the second mode, the excess of ink on the coating zone A falls back in the reservoir 11. The level of ink must be controlled by the level controller COi. Preferably, the level controller COi comprises sensors to monitor the level of ink within the reservoir 11.

In one embodiment, the controllers comprise a pre-store program comprising instructions to operate the coating module 10 according to the first mode and to operate the coating module 10 according to the second mode. The coating module 10 may comprise automatically run the first mode at the start of the coating module 10. In one embodiment, the controllers automatically run the second mode after a predetermined time of running the first mode. In another embodiment, the coating module 10 automatically run the second mode once a stability of the coating is detected.

The term "ink" in the present description comprises but is not limited to any type of coating material.

To conclude, the present invention and the described embodiments provide a coating module to coat a ribbon. In contrast with the other coating module of the prior art, the particular structure of the coating module of the present invention allows a homogeneous coating of a thin layer of ink (e.g., less than 10 μm) with all types of inks.

The invention claimed is:

1. A coating module for variable speed ribbon coating, said coating module comprising:

a ribbon comprising an inner face and an outer face, said outer face being designed to retain ink on its surface;

a conveyor system comprising a support element holding and transporting the ribbon on its inner face;

a squeeze ink roller arranged in contact with the outer face of the ribbon, said squeeze ink roller comprising an outer layer made of elastic material;

a reservoir assembly designed to hold ink thereon and to feed the squeeze ink roller with said ink, and a pressure controller comprising an active element for pressing the ribbon between the squeeze ink roller and the support element along a coating zone, wherein an elasticity of the outer layer of a surface of squeeze ink roller and a surface of the support element are designed in such a way that stress applied to the ink along the coating zone in a plane perpendicular to a longitudinal axis of the squeeze ink roller is monotonic on both sides of a global maximum.

2. The coating module according to claim 1, wherein the outer layer of the squeeze ink roller comprises an elastomer such as a rubber.

3. The coating module according to claim 1, wherein the support element is a support roller.

4. The coating module according to claim 3, wherein a surface of the support roller and/or of the squeeze ink roller in contact with the ribbon is smooth.

5. The coating module according to claim 1, wherein an arithmetic average of a roughness profile of a circumferential surface of the squeeze ink roller is inferior to 2 micrometers.

6. The coating module according to claim 5, wherein the arithmetic average of the roughness profile of the circumferential surface of the squeeze ink roller is inferior to 0.5 micrometer.

7. The coating module according to claim 1, wherein the surface of the squeeze ink roller does not comprise a raster of depressions or cavities having a depth superior to 5 μm.

8. The coating module according to claim 1, wherein the pressure controller is configured to control a pressure between the squeeze ink roller and the conveyor system.

9. The coating module according to claim 8, wherein the pressure controller is configured to automatically adjust a pressure between the squeeze ink roller and the conveyor system when a first speed of the ribbon is modified.

10. The coating module according to claim 8, wherein the pressure controller comprises communication means to receive instruction and is configured to automatically adjust the pressure between the squeeze ink roller and the conveyor system when an instruction is received by said controller.

11. The coating module according to claim 1, comprising a speed controller, wherein the speed controller comprises a first motor for controlling a first speed of the ribbon and/or a second motor for controlling a second tangential speed of the squeeze ink roller.

12. The coating module according to claim 1, further comprising a heater to heat the ribbon within the coating zone.

13. A method to coat a ribbon comprising:

providing a coating module according to claim 1;

providing an ink from the reservoir to a circumferential surface of the squeeze ink roller;

transporting the ribbon along its path between the support roller and the squeeze ink roller;

heating the ink in contact with both the squeeze ink roller and the ribbon, and;

applying a pressure to said ink between the ribbon and the squeeze ink roller.

14. The method to coat a ribbon according to claim 13, further comprising creating an ink molten pool between the squeeze ink roller and the ribbon, said ink molten pool being formed at a junction between the ribbon supported by the support roller and the squeeze ink roller at an entry of the coating zone.

15. A thermal transfer printing apparatus comprising a coating module according to claim 1, wherein the ribbon is an endless ribbon and wherein the printing apparatus further comprises a printhead and a conveyor system being designed to hold and transport the ribbon from the coating zone to the printhead and from the printhead to the coating zone to recoat the ribbon.

* * * * *